United States Patent
Zizzi

[19]

[11] Patent Number: 6,139,230
[45] Date of Patent: *Oct. 31, 2000

[54] SYSTEM FOR LOCKING A SKI-BASED VEHICLE TO A PLATFORM

[75] Inventor: Blake Zizzi, Cos Cob, Conn.

[73] Assignee: Imvento Enterprises LLC, Stamford, Conn.

[ * ] Notice: This patent is subject to a terminal disclaimer.

[21] Appl. No.: 09/040,793

[22] Filed: Mar. 18, 1998

Related U.S. Application Data

[63] Continuation-in-part of application No. 08/923,374, Sep. 3, 1997, abandoned, which is a continuation-in-part of application No. 08/708,395, Sep. 4, 1996, Pat. No. 5,902,081.

[51] Int. Cl.[7] ........................................................ B60P 7/08
[52] U.S. Cl. .......................................... 410/3; 410/2; 410/7
[58] Field of Search .................................. 410/2–4, 7, 9, 410/19, 77; 243/500

[56] References Cited

U.S. PATENT DOCUMENTS

| | | |
|---|---|---|
| 3,730,552 | 5/1973 | Clark . |
| 3,923,335 | 12/1975 | Erickson . |
| 4,143,799 | 3/1979 | Dietlein et al. . |
| 4,312,467 | 1/1982 | Kulwin . |
| 4,717,055 | 1/1988 | San Juan . |
| 5,044,845 | 9/1991 | Baker, Jr. ..................................... 410/3 |
| 5,203,655 | 4/1993 | Persau ........................................ 410/3 |
| 5,387,070 | 2/1995 | Roeling . |
| 5,607,270 | 3/1997 | Zimmerman ............................... 410/3 |
| 5,785,471 | 7/1998 | Godbersen ................................. 410/3 |
| 5,816,757 | 10/1998 | Huston ....................................... 410/3 |
| 5,902,081 | 5/1999 | Zizzi ........................................... 410/3 |

*Primary Examiner*—Stephen T. Gordon
*Attorney, Agent, or Firm*—Ohlandt, Greeley, Ruggiero & Perle, L.L.P.

[57] ABSTRACT

There is provided a system for locking skis of a snowmobile to a platform. The system includes a shaft having a lower portion secured to the platform and an upper portion for supporting an adjustment nut and a handle that rotates about the upper portion. The upper portion of the shaft has threads at its outer surface. Also, a bar is situated below the adjustment nut so that it may be adjusted between a first position where the bar holds the skis against the platform, and a second position where the bar releases the skis. In particular, the adjustment nut changes its vertical position when rotated about the upper portion of the shaft and, thus, is capable of adjusting the vertical position of the bar as well.

45 Claims, 12 Drawing Sheets

BOTTOM VIEW
FIG. 13

SYSTEM FOR LOCKING A SKI-BASED VEHICLE TO A PLATFORM

This is a continuation-in-part application of U.S. Pat. application Ser. No. 08/923,374 filed on Sep. 3, 1997, now abandoned which is a continuation-in-part of U.S. Pat. application Ser. No. 08/708,395, filed Sep. 4, 1996, now U.S. Pat. No. 5,902,081.

BACKGROUND OF THE INVENTION

I. Field of the Invention

The present invention relates generally to systems for supporting skis, ski mobiles and the like on mobile platforms. More particularly, the present invention relates to an adjustable, quick-acting locking mechanism for securely maintaining skis, particularly the skis of a snowmobile or other ski-based vehicle, against a surface, such as the upper surface of a trailer bed or platform. The present invention is a mechanism for securely clamping skis to the upper surface that is easy to use, simple to install and disassemble, and provides a swift actuator for quick locking and unlocking of the skis from the upper surface.

II. Description of the Prior Art

Skis, such as snow skis or water skis, are generally used on snow or water surfaces and are transported over dry land by a supporting mechanism, such as a ski rack. Conventional ski racks attach to the roof, trunk or bumper of an automobile and support the skis during transit. Examples of such ski racks are provided in U.S. Pat. No. 4,143,799 to R. W. Dietlein, et al., which issued on Mar. 13, 1979, titled SKI RACK FOR VEHICLES; U.S. Pat. No. 4,312,467 to R. Kuiwin, which issued on Jan. 26, 1982, titled DOUBLE TIER AUTOMOTIVE SKI RACK; and U.S. Pat. No. 4,717,055 to A. San Juan, which issued on Jan. 5, 1988, titled BRACKET FOR TRUNK MOUNTING SKI OR SURFBOARD RACK. However, these conventional ski racks are complicated mechanisms that require much time and effort to secure and remove the skis Likewise, attachment and detachment of the ski rack to and from the automobile are also time consuming and difficult.

Similarly, ski-based vehicles, such as snowmobiles and jet skis, are also transported over dry land. These ski-based vehicles are transported by a mobile platform, such as a trailer bed, that includes a locking mechanism to anchor the vehicle to the platform during transit and/or to prevent theft of the vehicle. For example, U.S. Pat. No. 3,730,552 to R. C. Clark, which issued on May 1, 1973, titled LOAD ANCHORING DEVICE, provides an anchoring device for supporting a snowmobile on the upper deck of a trailer. The anchoring device is an elongated plate having one end hinged to the upper deck and the other end attached to the back of the snowmobile.

Also, U.S. Pat. No. 3,923,335 to J. A. Erickson, which issued on Dec. 2, 1975, titled CAMPER UNIT FOR SNOWMOBILE TRAILERS and U.S. Pat. No. 5,387,070 to J. E. Roeling, which issued on Feb. 7, 1995, titled COUPLING SYSTEM FOR MOTORIZED VEHICLES, each provide a mobile platform having an upper deck for a supporting snowmobile. The skis of the snowmobile include a large loop at their front ends. Each mobile platform includes a rod that passes through the loop of the skis to retain the front end of the skis on the platform.

The mechanisms described in the above cited patents do not safely retain the skis of the snowmobile to the platform. A snowmobile is large, heavy vehicle that requires substantial support and security when moved. The mechanisms of the above patents rely on the weight of the snowmobile to retain it on the platform. However, the snowmobile's skis are not securely held against the platform. Therefore, the snowmobile is subject to violent movement during transport. Accordingly, such insecure movement of the snowmobile is dangerous and can cause damage to the snowmobile and/or the mobile platform.

Mechanisms for securely holding skis to the upper surface of a mobile platform are known. For example, U.S. Pat. No. 5,044,845 to V. J. Baker, Jr., which issued on Sep. 3, 1991, titled SNOWMOBILE TRANSPORT APPARATUS, provides a locking mechanism for maintaining the skis of a snowmobile against the upper deck of a trailer. Specifically, a pair of forward slots and a corresponding pair of rear slots are formed through the mobile platform. Hook members are projected through the rear slots, and actuator handles are directed through the forward slots. To secure the snowmobile's skis to the mobile platform, a latch rod is positioned over and held against the skis by the hook members when activated by the actuator handles. However, this locking mechanism is complicated and requires time and effort to secure and remove the skis. In addition, attachment and detachment of the locking mechanism to and from the mobile platform are also time consuming and difficult.

In view of the above patents, it is apparent that mechanisms for providing a secure hold of skis against a surface, preferably upper surface, of a mobile platform tend to be complicated and difficult to use. Analogously, the complicated design of such mechanisms are expensive to install and manufacture.

One mechanism that provides a secure hold is a mechanism that includes a lock bar placed over the skis and a clamping device situated through a middle aperture of the lock bar that clamps the lock bar downward against the skis. For example, U.S. Pat. No. 5,203,655 to D. Persau, which issued on Apr. 20, 1993, titled LOCKING BAR FOR SNOWMOBILE ON TRAILER, provides a lock bar and a clamping device having a threaded shaft that passes through an aperture of the lock bar and screws into a receiving hole formed at the upper surface of a mobile platform. By rotating the entire clamping device, including its threaded shaft, the lock bar is clamped downward against the snowmobile's skis.

However, the clamping device of U.S. Pat. No. 5,203,655 is cumbersome and awkward to use. In particular, the threaded shaft of the clamping device must be alignment with the receiving hole of the platform. This is difficult to accomplish since the lock bar obstructs the users view of the receiving hole. Also, the clamping device is unwieldy to use since the threaded shaft rotates with its respective handle and the only stationary structure for supporting the device is the receiving hole of the platform. The threads of the shaft have a progressive slope so that the lower portion of the clamping device will be securely maintained against the platform. Due to this progressive slope, the shaft requires numerous turns to make a slight vertical adjustment relative to the platform. Furthermore, the clamping device is difficult to remove from the platform since it must be completely unscrewed from the receiving hole. This removal process is particularly time consuming.

The present invention is particularly well suited for locking or otherwise supporting individual skis or a ski-based vehicle to an upper surface of a mobile platform, such as a trailer bed. In particular, the present system for locking one or more skis against a platform includes a shaft having a lower end that is secured to the platform and an adjustment assembly that easily mounts at the upper end for rotation about the shaft. The shaft provides solid support for the adjustment assembly. The adjustment assembly easily rotates about the shaft. In addition, the upper portion of the shaft has certain threads or structure that provide a quick-acting mechanism for locking and unlocking the skis to the platform.

SUMMARY OF THE INVENTION

Against the foregoing background, it is a primary object of the present invention to provide an easy-to-use locking mechanism for securely holding skis, particularly those of a snowmobile or jetski, against a surface of a mobile platform.

It is another object of the present invention to provide such a locking mechanism that provides for quick locking of the skis in place and, likewise quick release of the skis from its secure hold.

It is a further object of the present invention to provide such a locking mechanism that may be quickly and easily separated from an upper surface of the mobile platform.

It is a still further object of the present invention to provide such a locking mechanism that includes a quick adjustment to accommodate skis of different height.

To accomplish the foregoing objects and advantages, the present invention is a system for locking at least one ski against a platform which, in brief summary, comprises a shaft having an end that is secured to the platform, an adjustment assembly that is disposed for rotation about the shaft, and means for holding the at least one ski against the platform. The holding means is disposed adjacent to the adjustment assembly. The adjustment assembly includes a body having a bore therethrough for receiving the shaft, and a plurality of pins arranged in the body, with each of the pins having a portion extending into the bore to engage the shaft. The adjustment assembly effectively changes its axial position when rotated about the shaft. The adjustment assembly has a first position for securing the at least one ski between the holding means and the platform, and a second position for releasing the least one ski from between the holding means and the platform.

In another embodiment, the present invention provides a locking mechanism generally for securing an adjustment assembly (e.g., an adjustment nut) and holding means (e.g., a bar) at a desired position about shaft. The locking mechanism includes a locking bar overlying and connected to a portion of an upper surface of the holding means and a handle having connected thereto a handle flange extending across a portion of the handle.

In operation, the adjustment assembly is rotated or allowed to rotate about the shaft towards the holding means to a resting position (e.g., in contact with upper surface of the holding means). One end of the handle is then inserted into an access point of the adjustment assembly, preferably at a position about 90° degrees or greater relative to the locking bar. Thereafter, the adjustment assembly is torqued (via the handle) to a tightened position, with a portion of the handle flange being inserted through opening of the locking bar. A clip, cotter pin or the like (generally referred herein as clip) is then inserted through both the handle flange and the locking bar to secure the adjustment assembly and the holding means in place, e.g., at the tightened position.

In yet another embodiment, the present invention comprises a lower shaft that is secured to the platform and an upper shaft that is coupled to the lower shaft and supported above the platform. The adjustment assembly is disposed for rotation about the upper shaft and effectively changes its axial position when rotated about the upper shaft.

BRIEF DESCRIPTION OF THE DRAWINGS

The foregoing and still further objects and advantages of the present invention will be more apparent from the following detailed explanation of the preferred embodiments of the invention in connection with the accompanying drawings.

DETAILED DESCRIPTION OF THE PREFERRED EMBODIMENTS

Figure 1:
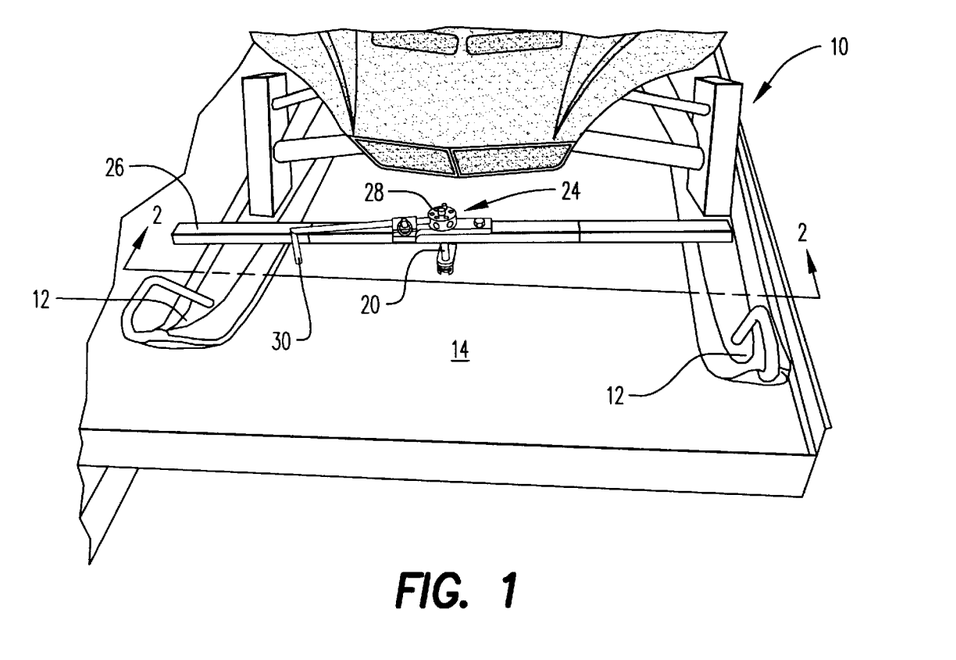
FIG. 1 is a perspective view of a first preferred embodiment of the present invention.

Referring to the drawings and, in particular, to FIG. 1, there is provided a system of the preferred embodiment which is generally represented by reference numeral 10. As shown in FIG. 1, system 10 is used to lock one or more skis 12 against a platform 14, preferably against an upper surface of a mobile platform. The system 10 comprises a shaft 20, an adjustment assembly 24 disposed about an upper portion of the shaft, and a bar or plate 26 adapted to be positioned over skis 12. In this embodiment, the shaft 20 preferably has a lower shaft 32 (shown in FIG. 2) secured to platform 14 and an upper shaft 34 opposite the lower shaft.

The bar 26 is a bar that assists locking or securing in place skis 12. The lock bar 26 may be provided by the vendor of platform 14. The lock bar 26 preferably has a middle aperture (not shown) for receiving shaft 20. In operation, adjustment assembly 24 presses lock bar 26 downward against skis 12 and clamps the skis between the lock bar and the upper surface of platform 14.

Figure 2:
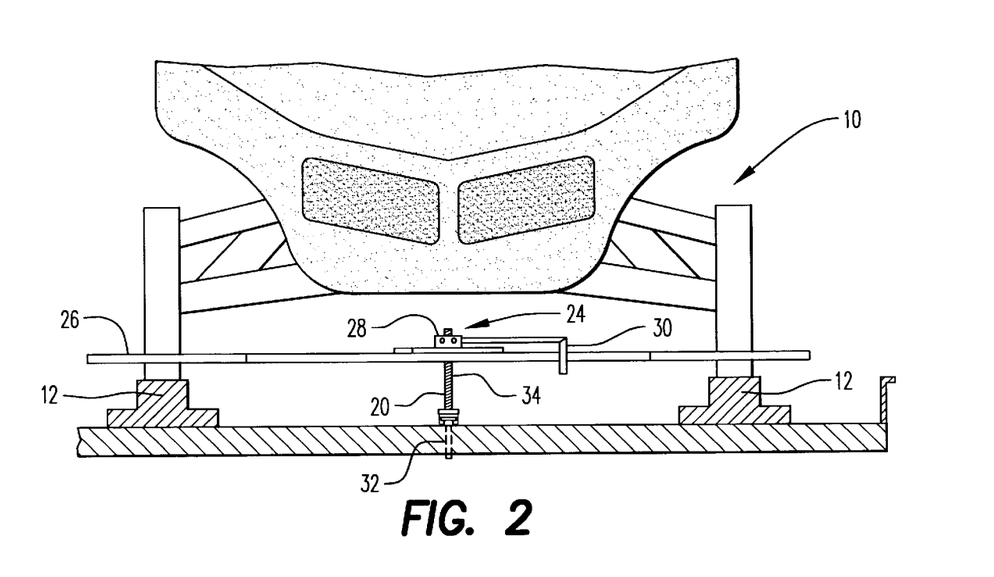
FIG. 2 is a cutaway view of the first preferred embodiment taken along line 2—2 of FIG. 1.

Referring to FIGS. 1 and 2, adjustment assembly 24 includes an adjustment nut 28 adapted to be positioned on shaft 20, and may include a handle 30 adapted to engage the adjustment nut. The adjustment nut 28 is rotatable about shaft 20. The shaft 20 remains stationary when properly engaged with platform 14.

The handle 30 is adapted to be removably secured to adjustment nut 28 to rotate the adjustment nut. By rotating adjustment nut 28 about shaft 20, adjustment assembly 24 changes its axial position, upward or downward, relative to the shaft. As an example of the preferred embodiment, adjustment nut 28 axially descends by rotating it about shaft 20 in a clockwise direction (when viewed from above), and the adjustment nut axially ascends when rotated in a counterclockwise direction (or vice-versa). Pressure is applied to lock bar 26 when adjustment nut 28 is adjusted downward, and the pressure is released from the lock bar when the adjustment nut is adjusted upward. Thus, by rotating adjustment nut 28, preferably by using handle 30, skis 12 are clamped against or unclamped from the upper surface of platform 14. For the preferred embodiment, adjustment assembly 24 has a first position for securing skis 12 between lock bar 26 and platform 14, as shown in FIG. 1, and a second position for releasing the skis from between the lock bar and the platform, as shown in FIG. 2.

Figure 3A:
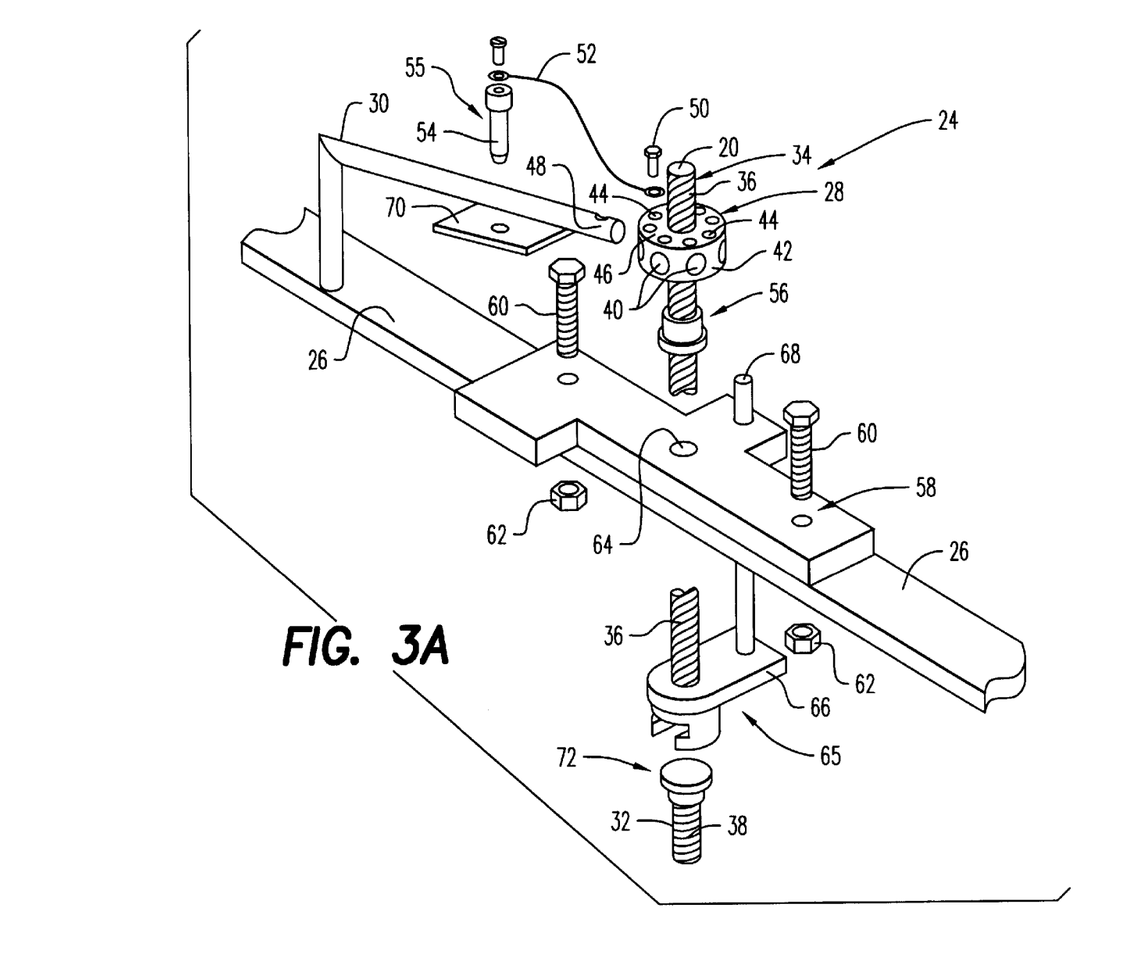
FIGS. 3A is an exploded view of the first preferred embodiment of FIG. 1.

As shown in FIG. 3A, upper shaft 34 has, on its outer cylindrical surface, upper threads 36, while the lower shaft 32 has lower threads 38 on its outer cylindrical surface. The upper threads 36 are preferably multistart or multilead threads. Two preferred multistart or multilead threads are an acme thread and a square thread. Both of these threads are preferred since they are easier to cut or make.

The lower threads 38 are standard threads. For the preferred embodiment, upper threads 36 include eight threads formed about upper shaft 34 so that they extend an axial distance about ½ of an inch to about 1 inch for every rotation of each thread. Also, lower threads 38 of lower shaft 32 provides a secure connection to platform 14.

The multistart or multilead threads of upper shaft 34 provide for the quick-acting feature of the present invention. The structure of these upper threads 36 provides adjustment nut 28 with the capability of significant axial adjustment when rotated about upper shaft 34. Accordingly, a slight turn of adjustment assembly 24 causes significant vertical adjustment of adjustment nut 28, thus permitting a user to quickly and easily lock and unlock skis 12 to platform 14 (as shown in FIGS. 1 and 2).

As shown in FIG. 3A, adjustment nut 28 has an outer cylindrical surface 42 and a top, preferably, planar surface 46. The outer surface has a plurality of handle receiving apertures 40. The planar surface 46 has a plurality of corresponding bolt receiving apertures 44 therein. The crank 30 has a distal end 48 that may be inserted into any one of the handle receiving apertures 40. The distal end 48 of crank 30 may be held in place by a detente pin 50 that is inserted into the respective bolt receiving aperture 44. The detente pin 50 may also used to hold a retainer line 52 for a corresponding retainer pin 54 50 that the retainer pin is not separated and lost. Although not shown, retainer pin 54 may be replaced with a padlock or other securing means.

The adjustment assembly 24 also includes a lifting nut 56 that attaches to the bottom surface and inner bore of adjustment nut 28. The adjustment nut 28 has an inner groove (not shown) for receiving upper threads 36, namely the multistart or multilead threads, at the outer cylindrical surface of upper shaft 34 and, thus, works in conjunction with the upper shaft to provide the fast lifting feature of the present invention. In addition, lifting nut 56 provides a bearing between adjustment nut 28 and lock bar 26.

This embodiment has an anti-rotation element 65 and a locking element 55. Both anti-rotation element 65 and locking element 55 use a top plate 58. The top plate 58 is connected to lock bar 26, preferably, by fasteners, such as fastening bolts 60 and nuts 62 shown in FIG. 3A. The anti-rotation element 65 acts as an anchor to prevent a foot or foot element 66 from rotating. This is due to element 65 connection to top plate 58, which in turn is connected to lock bar 26. The locking element 55 prevents adjustment assembly 24 from rotating about upper shaft 34. The top plate 58 includes a central aperture 64 for permitting shaft 20, particularly upper shaft 34, to pass therethrough. For anti-rotation element 65, foot 66 is connected to upper shaft 34 and an anti-rotation pin 68 connects top plate 58 to the foot. Thus, foot 66 is immobile relative to upper shaft 34. For locking element 55, handle 30 includes a handle plate 70 that is connected to top plate 58 by retainer pin 54 to prevent it from moving.

Figure 3B:
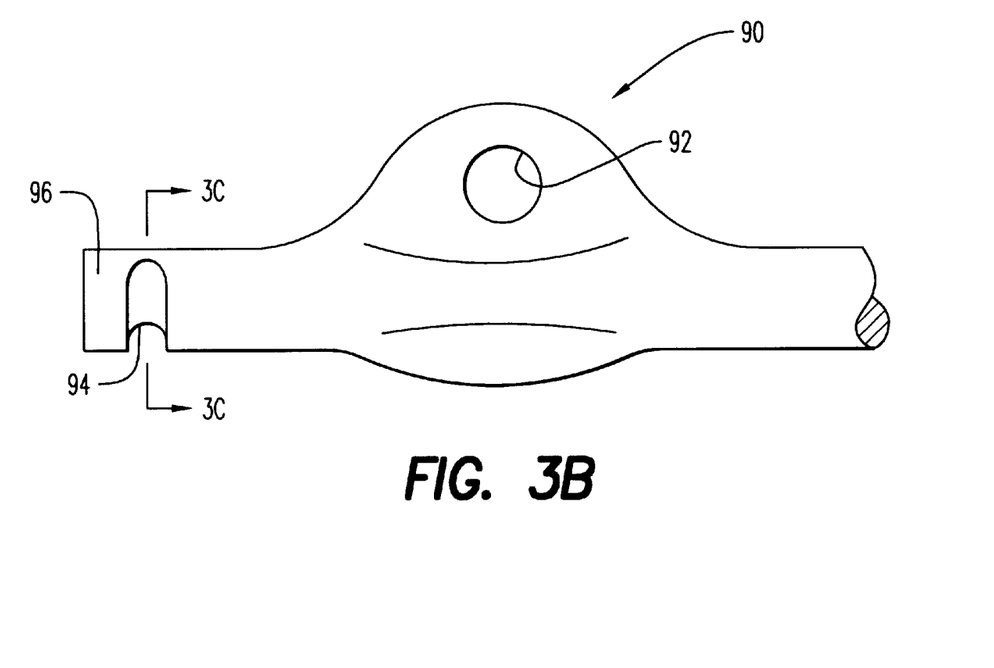
FIG. 3B is a perspective view of an alternative handle for the preferred embodiment of FIG. 1.
Figure 3C:
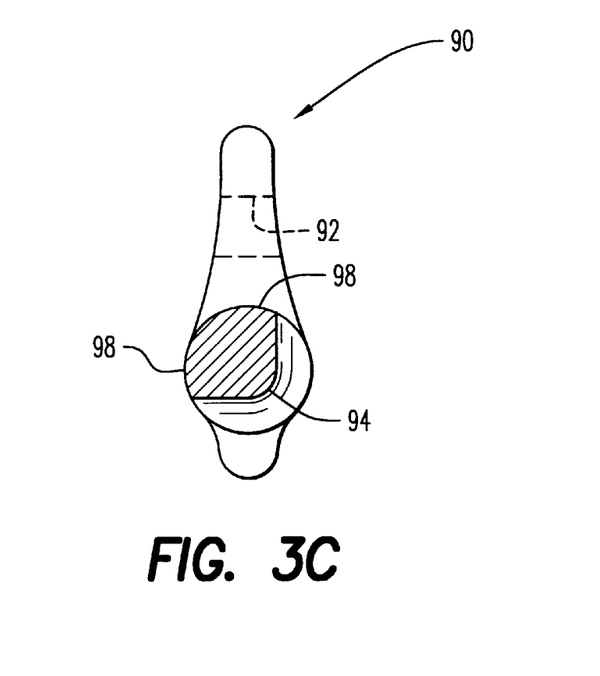
FIG. 3C is a sectional view of the alternative handle taken along line 3C—3C of FIG. 3B.

Referring to FIGS. 3B and 3C, there is shown an alternative handle 90. In contrast to handle 30 and handle plate 70 shown in FIG. 3A, handle 90 has an integral aperture 92 that serves the same function as the handle plate. In addition, handle 90 has an annular groove 94 formed at its distal end 96. For the preferred embodiment shown in FIGS. 1 and 2, a three-quarter turn of adjustment nut 28 is required to clamp and unclamp the skis. However, the free end of handle 90 may prevent it from rotated more than a one-half turn. Accordingly, annular groove 94 has two open sides 98 so that the free end of handle 90 may be rotated 90° degrees in order to continue the three-quarter turn. The particular shape of annular groove 94 may also be formed at distal end 48 of handle 30 shown in FIG. 3A.

Referring again to FIGS. 2 and 3A, a member 72 provides for engagement and disengagement of lower shaft 32 and upper shaft 34. The member 72 may have a variety of different forms and configurations. The member 72 provides for a secure connection between upper shaft 34 and platform 14 when they are attached and, yet, the upper shaft may be separated or reconnected to the platform when desired by the user.

Figure 4:
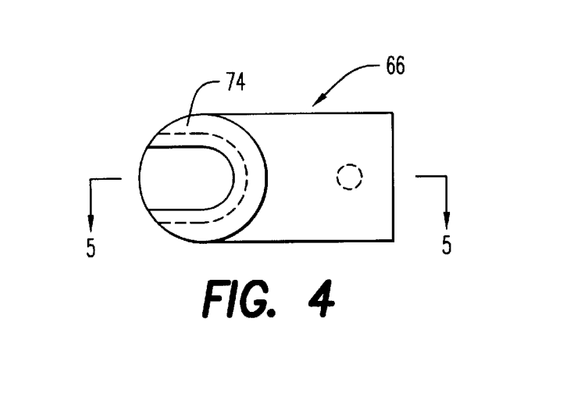
FIG. 4 is a top view of the anchor of FIG. 3.
Figure 5:
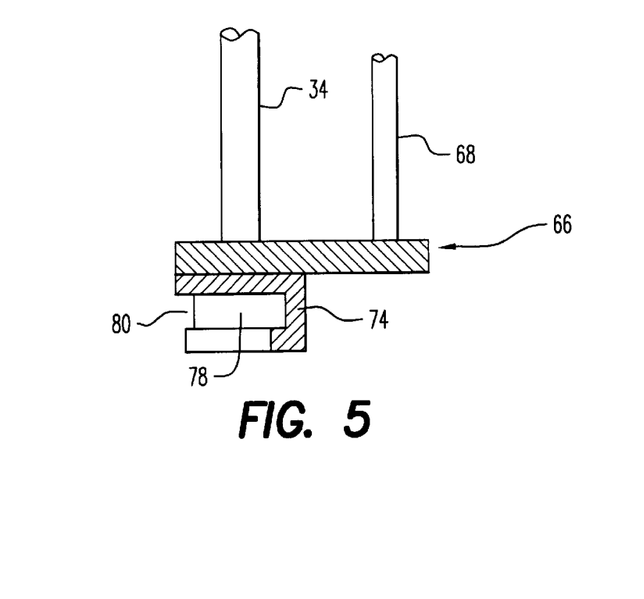
FIG. 5 is a sectional view of the anchor taken along line 5—5 of FIG. 4.
Figure 6:
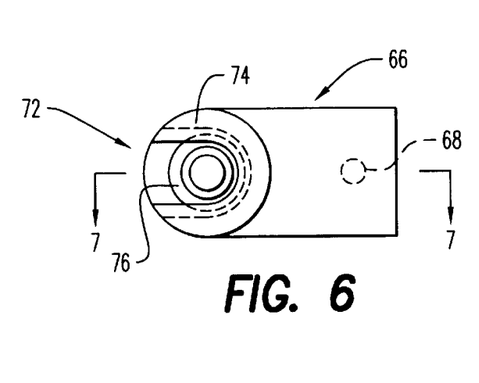
FIG. 6 is a top view of the anchor and foot of FIG. 3 in which the anchor is concealed by the foot.
Figure 7:
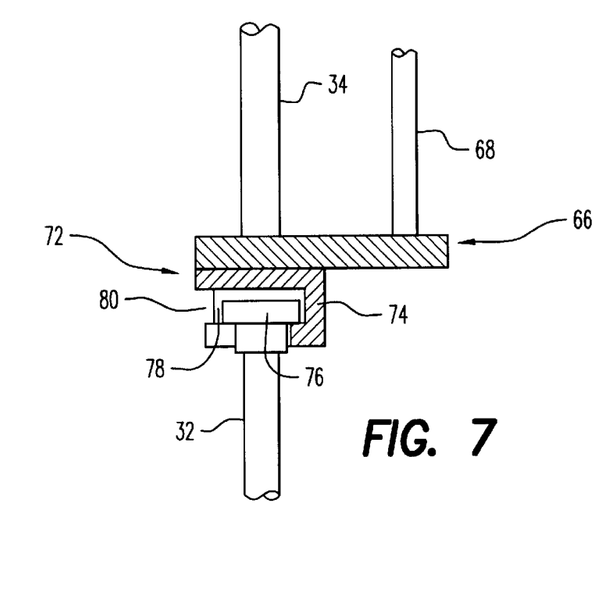
FIG. 7 is a sectional view of the anchor and foot taken along line 7—7 of FIG. 6.

FIGS. 4 through 7 show a preferred member 72 for this embodiment. The member 72 has an insertion end 74 that is formed at the bottom end of upper shaft 34, and has a receiving end 76 that is formed at the top end of lower shaft 32. As shown in FIGS. 4 and 5, receiving end 76 has an inner chamber 78 with an opening 80 on one side. As shown in FIGS. 6 and 7, insertion end 74 has an outer surface that permits the insertion end to slide through opening 80 and inner chamber 78. The upper portion of inner chamber 78 is formed to the exact shape of the insertion end's outer surface. When adjustment assembly 24 is at its first position for securing skis 12 between lock bar 26 and the upper surface of platform 14 (as shown in FIG. 1), lower shaft 32 and upper shaft 34 are pulled away from each other. Thus, insertion end 74 fits into the upper portion of inner chamber 78. At this position, insertion end 74 interlocks with receiving end 76. Likewise, to disengage these elements, adjustment assembly 24 is moved to its second position for releasing skis 12 from between lock bar 26 and the upper surface of platform 14 (as shown in FIG. 2). The insertion end 74 then moves down away from the upper portion of inner chamber 78 and slides out through opening 80.

Figure 8:
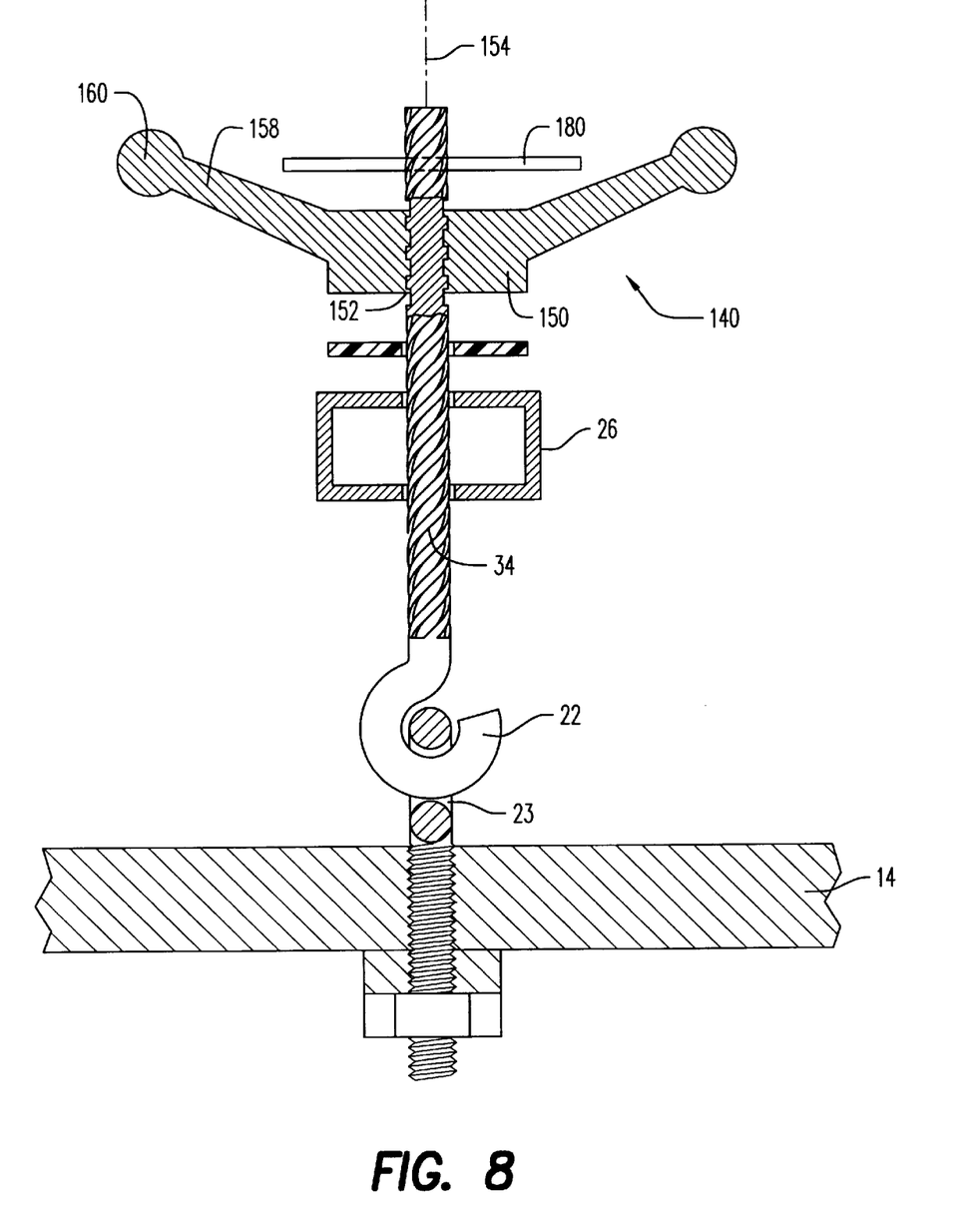
FIG. 8 is a sectional view of an adjustment knob that can be used as an alternative to the adjustment nut, lifting nut and handle of FIGS. 3A and 3B.

FIG. 8 shows an adjustment knob or nut 140 that is an alternative to the combination of adjustment nut 28, lifting nut 56 and top plate 58 of FIGS. 1 through 7. This adjustment knob 140 has a center portion 150 having a central bore 152 that is threaded to engage the threads of shaft 34, shown in FIG. 7. The central bore 152 extends through center portion 150 along a rotational axis 154 of adjustment knob 140. In this embodiment, shaft 34 is also preferably a single shaft. Moreover, the threads of shaft 34 are preferably acme or square threads.

The adjustment knob 140 has at least one arm 158 that preferably has a weighted terminal end 160. In a preferred embodiment, adjustment knob 140 has at least two arms 158. The weighted terminal end 160 adds mass that allows adjustment knob 140 to spin around shaft 34. The length of each lever arm 158 and weight of each terminal end 160 should be determined to balance the ability of adjustment knob 140 to rapidly engage bar 26, and the resistance to accidental disengagement of the threads when the adjustment knob is not adequately tightened against the bar. A preferred adjustment knob 140 is commercially available from Carr Lane Manufacturing Co. Such a preferred adjustment knob 140 has an overall height about two and one-quarter inches, a height from one end to the other end of its central bore of about one and one-eight inches, a span from one weighted terminal end 160 to an oppositely positioned weighted terminal end 160 of four and seven-eighth inches, and a diameter of the central bore of one-half inches. The normal threads in the central bore is ½ to ⅓ inch.

To rapidly lock the skis to platform 14, the threads of central bore 152 of adjustment knob 140 engage the threads of shaft 34. With the threads engaged, adjustment knob 140 can be rapidly moved toward platform 14 until the adjustment knob contacts bar 26 to initially lock the skis in place. Vertical adjustment of the position of adjustment knob 140 can then be made by rotating the adjustment knob around shaft 34 to lock securely the skis against platform 14.

To release the skis, adjustment knob 140 is initially rotated around shaft 34, so that the adjustment knob moves away from bar 26. The adjustment knob 140 can be rotated away from bar 26. The bar 26 can then slide back up shaft 34 to allow quick releasement of the skis from between the bar and platform 14. Specifically, when bar 26 is backed off end 22, the end can be released from foot 23 to permit the release of the skis.

Figure 9:
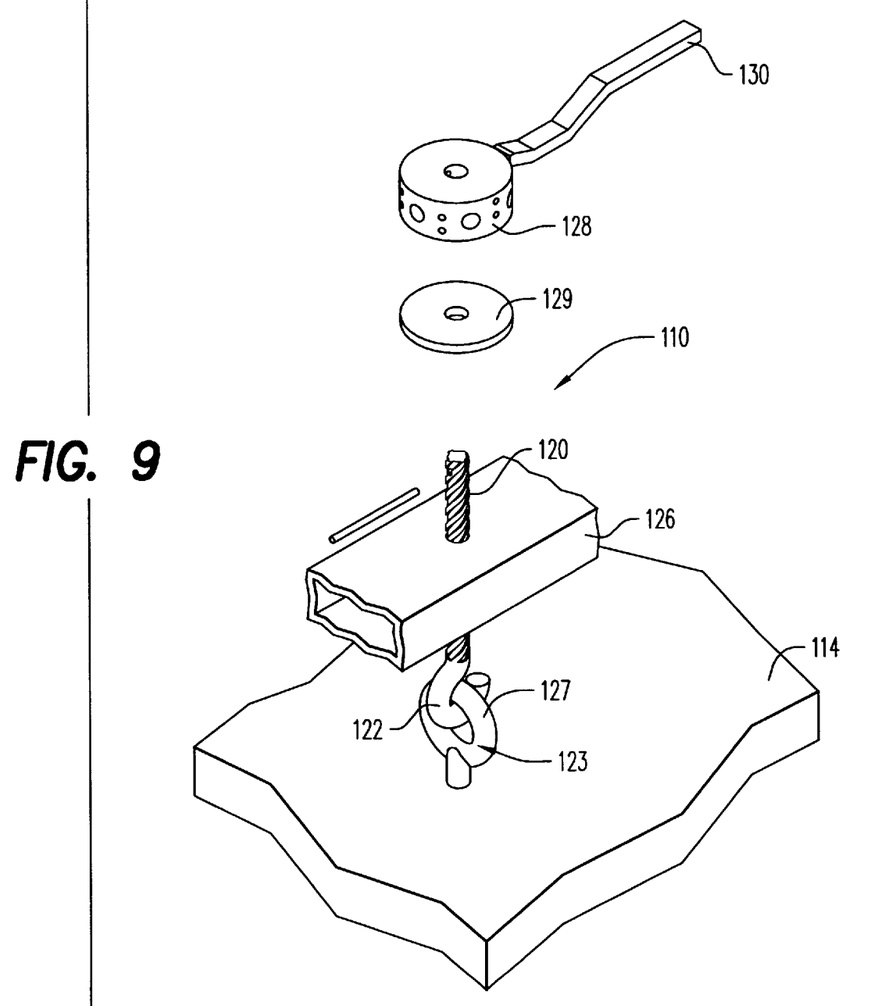
FIG. 9 is an exploded view of a second preferred embodiment of the present invention.
Figure 10:
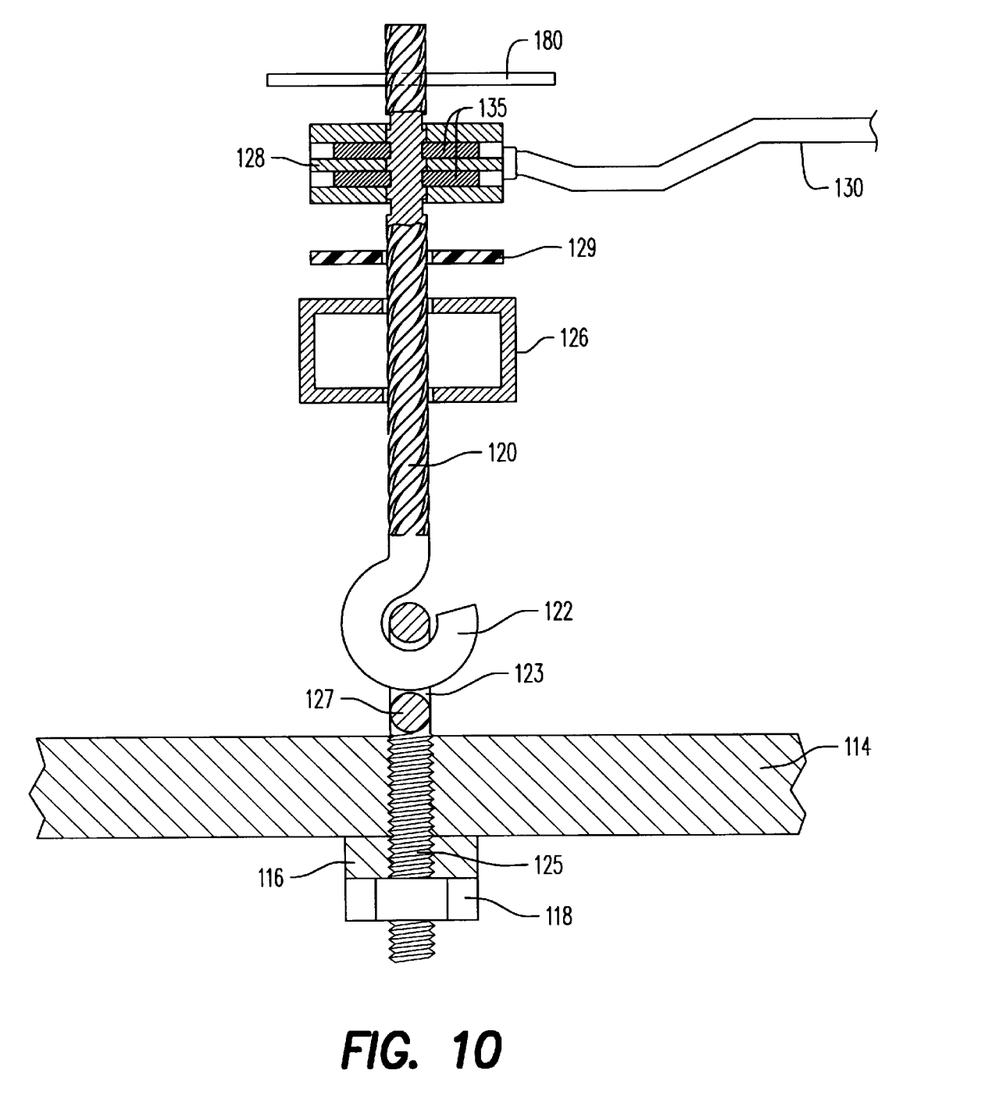
FIG. 10 is a sectional view of the second embodiment of FIG. 9.

Referring to FIGS. 9 and 10, these preferred embodiments have a system 110 that locks one or more skis against a platform 114, and preferably against an upper surface of the platform. The system 110 has: a shaft 120, analogous to upper shaft 34 of FIGS. 1 through 7, having a lower end 122; a foot 123, analogous to lower shaft 32, having a first end adapted to be secured to platform 114, identical to platform 14, and having a second end adapted to be secured to the lower end of shaft 120; a bar 126 analogous to bar 26; and, an adjustment nut or knob 128 adapted to be secured to the shaft. The system may also include a washer 129 that is positioned between bar 126 adjustment nut 128, a handle 130 adapted to engage adjustment nut 128, a removable nut 118 shown in FIG. 10, and a pin 180.

The lower end 122 of shaft 120 preferably is integrally secured to the remainder of the shaft. The lower end 122, preferably, has a hook shape that is readily adapted to engage foot 123.

The foot 123 has a first end 125 that is adapted to pass through platform 114 and engage nut 116, which is secured to the platform. Preferably, first end 125 has threads that can secure to platform 114. In addition, threaded end 125 engages nut 118 that, preferably, is positioned adjacent nut 116. The foot 123 also has a second end 127 that is adapted to engage lower end 122. The second end 127 of foot 123 is preferably an eyelet.

In the preferred embodiment shown in FIG. 10, adjustment nut 128 has a plurality of pins 135 that are adapted to engage the threads of shaft 120. The plurality of pins 135, preferably, form the pattern shown in FIG. 17.

Figure 17:
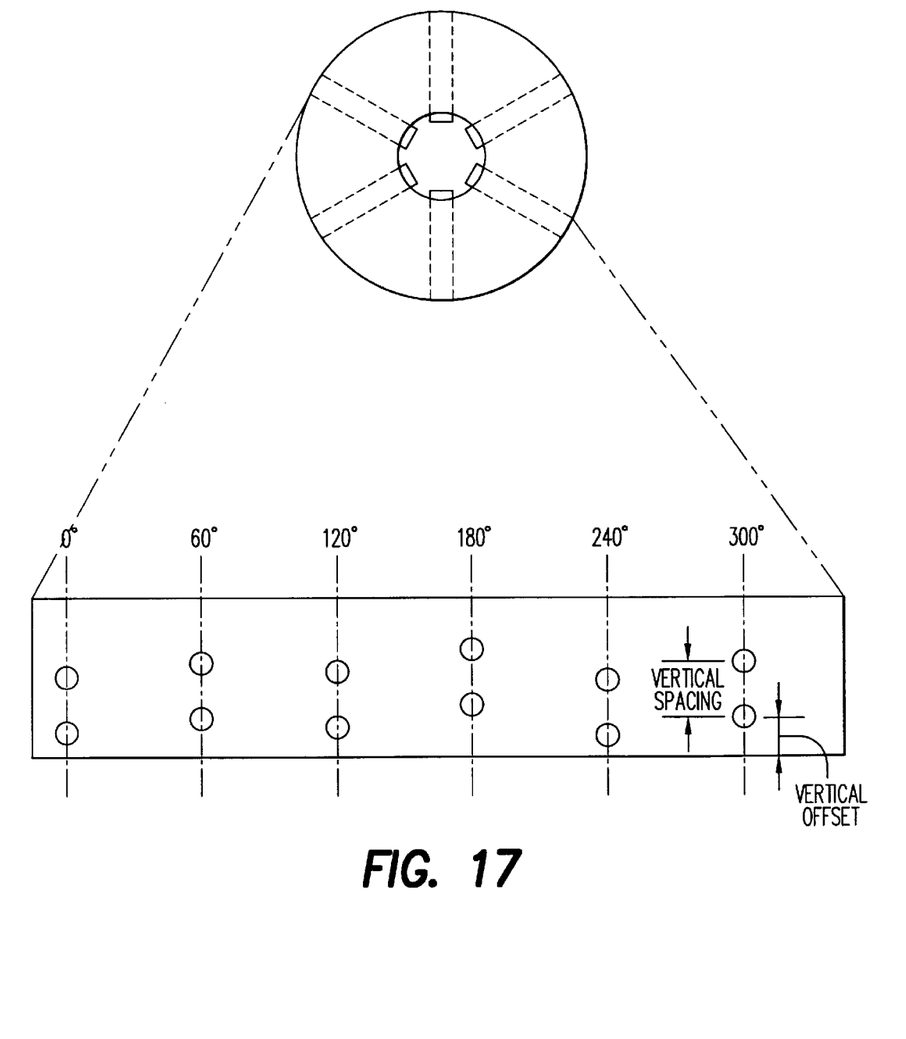
FIG. 17 depicts the pattern of the pins show in FIG. 16.

In this pattern, the vertical spacing equals the lead (the distance traveled per rotation of nut) divided by the number of starts, while the vertical offset equals the lead divided by six, the number of locations. For example, if the lead is 1.750 inches and there are four starts, the vertical spacing is 0.4375 inches. The 1.750 inches of lead divided by six, provides a vertical offset of 0.292 inches.

The plurality of pins 135 permit the ready engagement and disengagement with the threads of shaft 120 so that adjustment nut 126 can readily engage and disengage the shaft thereby readily securing and releasing the skis from platform 114. The ends of the plurality of pins 135 protrude slightly into the bore of adjustment nut 128 to engage the threads of shaft 120.

Figure 11:
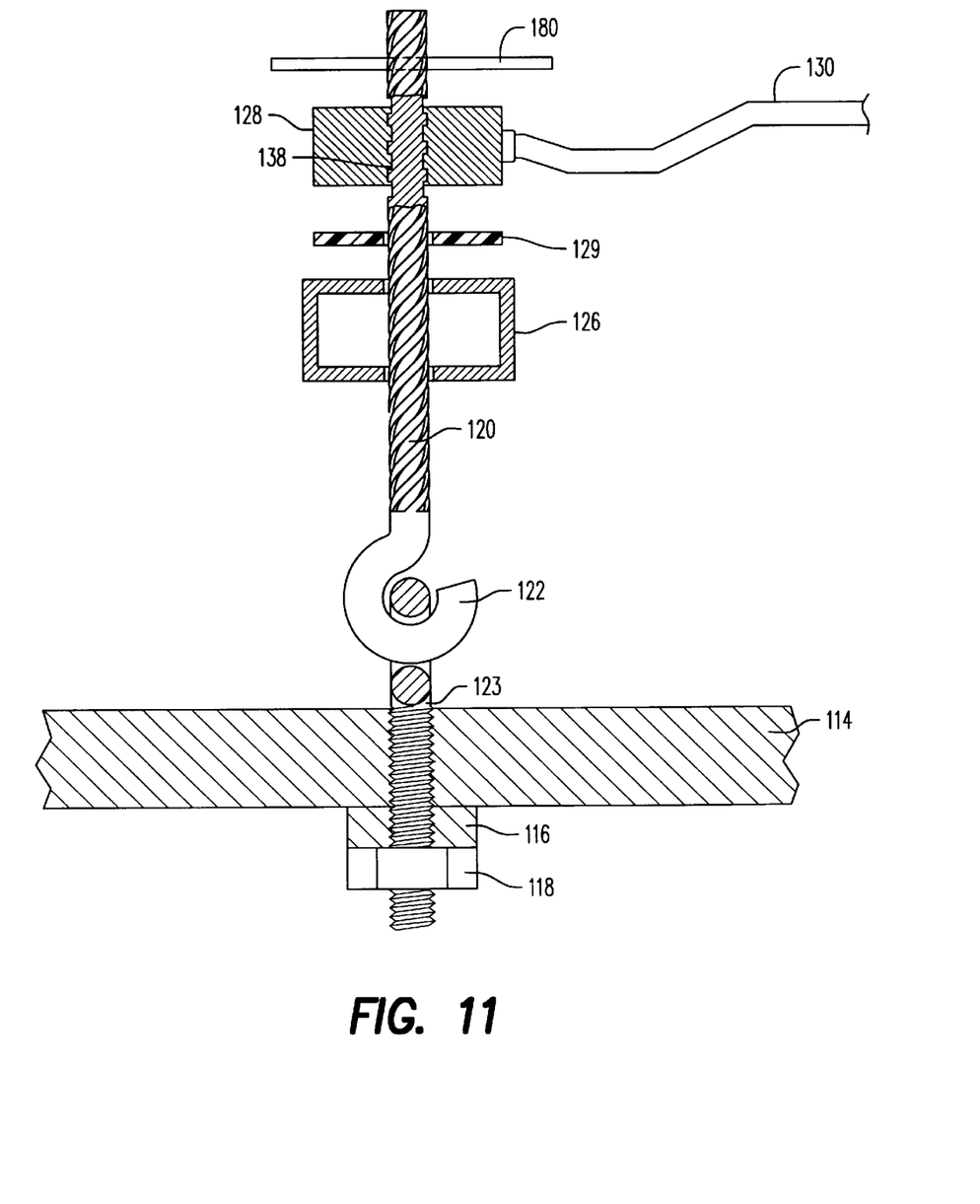
FIG. 11 is a sectional view of the second embodiment of FIG. 9, but with an alternative nut.

While the plurality of pins 135 shown in FIG. 10 have initially been found to facilitate the desired engagement and disengagement, adjustment nut 128 can have internal threads 138, shown in FIG. 11, that mate with the threads of shaft 120. In either embodiment, the mating of the threads of shaft 120 with either pins 135 or internal threads 138 of adjustment nut 128 are such as to facilitate their engagement and disengagement.

The handle 130 can have any shape or configuration provided it can be connected to adjustment nut 128 for rotation of the adjustment nut. The handle 130 shown in FIGS. 9 and 10 has a certain angle that will facilitate rotation of the adjustment nut 128.

The adjustment nut 128 preferably has a series of holes or access points 134 about its outer circumference. The access points 134 permit one end of handle 130 from engaging adjustment nut 128 to provide for rotation of the adjustment nut. The number of access points 134 can be any number that is permitted by the outer circumference of adjustment nut 128. However, too many access points 134 may weaken adjustment nut 128 and cost unnecessary machining time. Six access points 134 has been selected as the preferred number of access points since it gave the largest number of access points for the desired unit outer diameter or circumference of the adjustment nut.

Once the adjustment nut 128 rotates about shaft 120 to its tightened position, the adjustment is torqued. Accordingly, means are provided (not shown) that will prevent the adjustment nut from rotating in the opposite direction and, thus, untighten or untorque. Such means are presently envisioned as being a conventional clasp or clip that will hold handle 130 to bar 126 to prevent rotation of adjustment nut 128. An alternative means, not yet fully developed, is that handle 130 will rotate or turn upward downward about ninety degrees and, thus, lock adjustment 128 in place. Also in both the FIGS. 9 and 10 embodiments, washer 129 may be provided between adjustment nut 128 and bar 126 to provide better frictional engagement therebetween. Also, pin 180 may be provided to make the system a one-piece unit. In particular pin 180 prevents adjustment nut 128, washer 129 (optional), and bar 126 from being removed from shaft 120. Accordingly, all four components form a one-piece unit that can readily engage foot 123.

Figure 12:
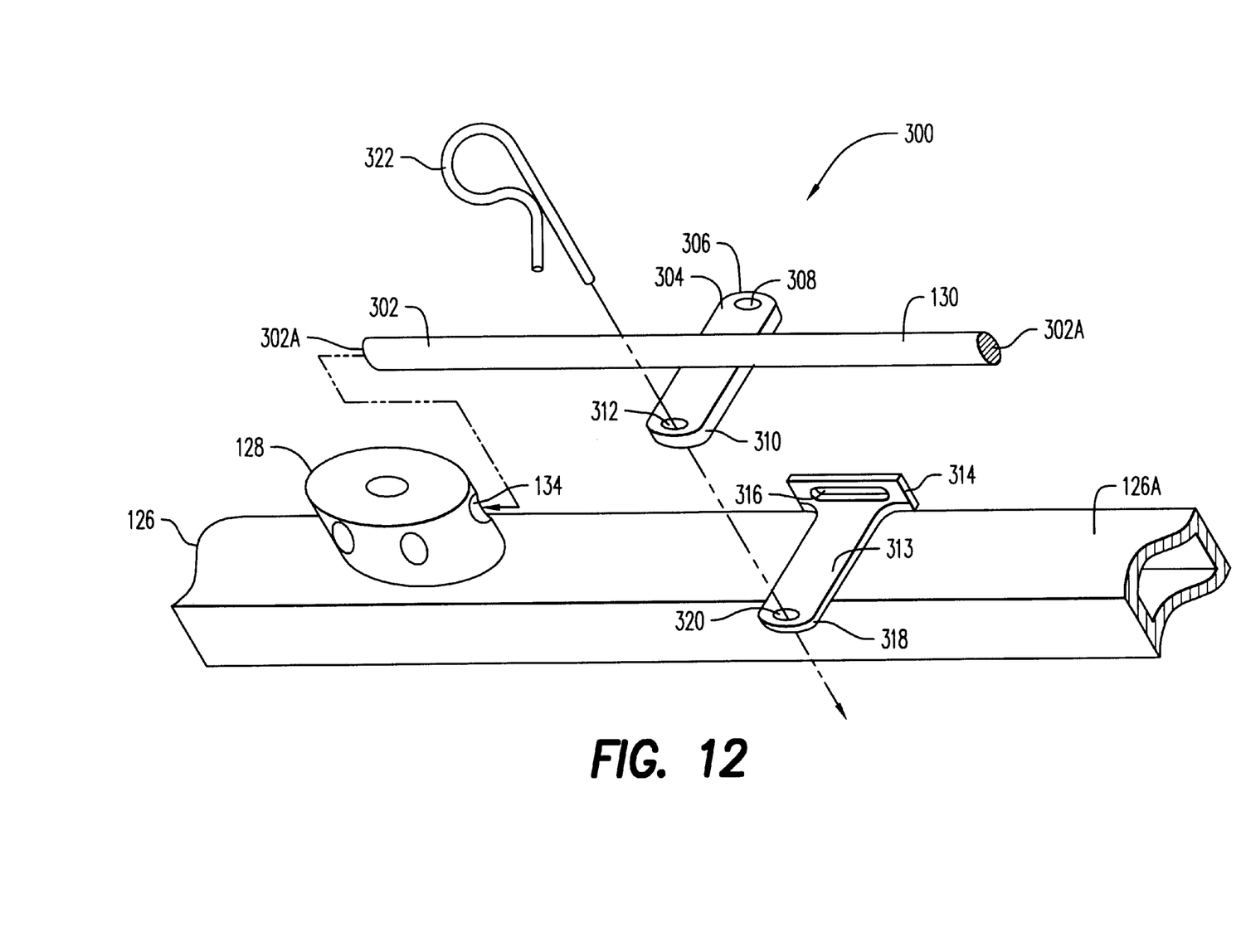
FIG. 12 is another embodiment of a locking mechanism of FIGS. 10 and 11.

Referring to FIG. 12, there is provided a perspective view of another locking mechanism generally denoted by reference numeral 300 for securing adjustment nut 128 and bar 126 at a desired position about shaft 120 (FIG. 10). Locking mechanism 300 includes a locking bar 313 overlying and connected to a portion of an upper surface 126A of bar 126 and a handle 302 having connected thereto a handle flange 304 extending across a portion of the handle. Once the adjustment nut 128 is tightened against bar 126, one end of handle 302 is connected to the adjustment nut and a portion of handle flange 304 is inserted through an opening of locking bar 313. A clip, cotter pin or the like 322 (generally referred herein as clip 322) is then inserted through both handle flange 304 and locking bar 313 to secure adjustment nut 128 and bar 126 in place, e.g., at the tightened position.

More specifically, locking bar 313 is connected substantially perpendicular to the upper surface 126A of bar 126. Locking bar 313 includes a first end 314 and a second end 318 opposite the first end. First end 314 extends away from the upper surface 126A of bar 126, preferably substantially orthogonal to the upper surface. First end 314 includes an opening 316 adapted to receive therethrough a portion of handle flange 304. Second end 318 extends past an edge of bar 126 and includes a hole 320 adapted to receive clip 322. It should be understood that locking bar 313 may be integral or connected to handle bar 126.

Handle 302 (e.g., a bar, rod or the like) is similar to handle 130 as shown in FIG. 10 and includes an end 302A, which is adapted to engage any one of access points 134 of adjustment nut 128 and may be employed to facilitate rotation of adjustment nut 128 about shaft 120. Handle flange 304 includes a first end portion 306 and a second end portion 310, both of which include holes 308, 312, respectively, that are adapted to receive clip 322. Handle flange 304 is connected across handle 302 at a predetermined position along the handle, such that end 302A of the handle may be inserted into an access point 134 (generally indicated by the dotted lines) and a portion of the handle flange (e.g., portion 306) may be inserted through opening 316 of locking bar 313. It should be understood that handle flange 304 may be integral or connected to handle 302.

It is preferred that handle flange 304 is arranged substantially perpendicular to handle 302, with each end portion 306, 310 approximately being equidistant from handle 302. Such an arrangement allows either end portions 306, 310 of handle flange 304 to be inserted through opening 316 of locking bar 313. Furthermore, handle 302 can have any shape or configuration provided it can be detachably connected to adjustment nut 128 and locking bar 313 to prevent removal of the adjustment nut and the locking bar from shaft 120.

An example of a locking operation is described below with reference to FIG. 12. Adjustment nut 128 is rotated or allowed to rotate about shaft 120 towards bar 126 to a resting position (e.g., in contact with upper surface 126A of the bar). One end 302A of handle 302 is then inserted into access point 134, preferably at a position about 90° degrees or greater relative to locking bar 313. Thereafter, adjustment nut 128 is torqued (via handle 302) to a tightened position, with first end 306 of handle flange 304 being inserted through opening 316. It should be understood that such an arrangement prevents axial movement of adjustment nut 128 along shaft 120.

Hole 312 of handle flange 304 is then aligned with hole 320 of locking bar 313 (if not already aligned), and clip 322 is inserted through both holes 312, 320 to secure adjustment nut 128 and bar 126 in place, e.g., at the tightened position. Such an arrangement prevents rotational movement of adjustment nut 128 about shaft 120 as well as rotational movement of handle in access point 134 (e.g., where the access point has a circular dimension). In the alternative, once first end 306 (and hole 308) of flange handle 304 is inserted into and through opening 316, clip 322 may be inserted through hole 308 to prevent rotational movement of adjustment nut 128 about shaft 120.

Figure 16:
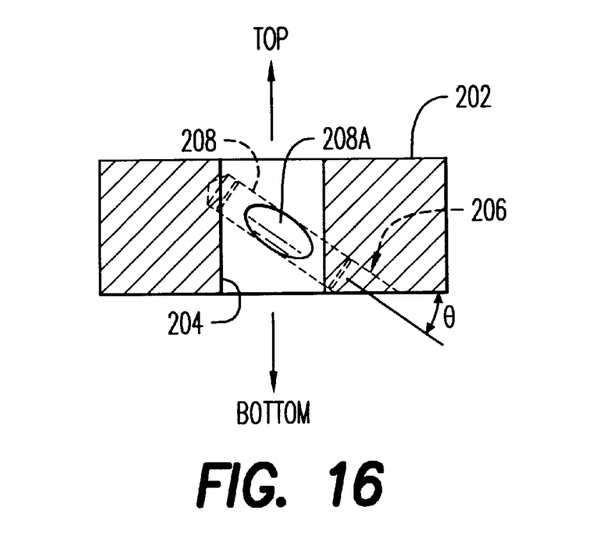
FIG. 16 is another cross-sectional view of the third embodiment of the adjustment nut of FIG. 13.

Referring to FIGS. 13 through 16, there is provided a third embodiment of adjustment nut 128, which includes a plurality of thread pins 208 arranged in the adjustment nut, such that a side surface portion of each pin 208 engages the threads of shaft 120. In particular, adjustment nut 128 includes a body 202 including a bore 204 therethrough that is adapted to receive shaft 120. Body 202 includes a plurality of pin cavities 206 spaced apart from each other and arranged at a predetermined angle for receiving respective thread pins 208, such as a press fit pin. Each pin cavity 206 extends preferably from a bottom surface of body 202 into bore 204 at the predetermined angle, generally referred herein as the helix angle $\theta$ (FIG. 16). Thread pins 208 may be inserted into pin cavities 206 respectively, with portion 208A of the thread pins extending into bore 204. Portions 208A are arranged to form a thread in bore 204 for engagement and disengagement of shaft 120.

Similar to the adjustment nut arrangement as shown in FIGS. 10 and 11, thread pins 208 permit the ready engagement and disengagement with the threads of shaft 120 so that adjustment nut 128 can readily engage and disengage the shaft, thereby readily securing and releasing the skis from platform 114. However, instead of having an end portion of each pin engaging the threads of shaft 120, the third embodiment of adjustment nut 128 employs a side surface portion 208A of each thread pin 208 to engage the threads of the shaft. It has been discovered that the third embodiment of adjustment nut 128 provides a stronger adjustment nut thread arrangement which is capable of withstanding greater forces than the adjustment nut arrangement of FIGS. 10 and 11. Moreover, the third embodiment of adjustment nut 128 provides an adjustment nut that is more cost efficient and easier to manufacture, than the adjustment nut arrangement shown in FIGS. 10 and 11.

More specifically, pin cavities 206 and thread pins 208 may be suitably configured to provide a desired thread pitch diameter (e.g., for the threading arrangement of shaft 120) by varying the helix angle $\theta$. An explanation of the interrelationship between the helix angle and the diameter pitch is provided below with reference to FIG. 16. There is shown a representative example of thread pin 208 arranged in pin cavity 206 at helix angle $\theta$, with a side surface portion 208A extending into bore 204 at the helix angle $\theta$. The helix angle $\theta$ may be estimated through the use of the following equation (1):

$$\theta = \tan^{-1} (L)/(d \times \pi) \qquad <1>$$

Where
 $\theta$ is the helix angle;
 L is the Lead or the distance traveled per rotation of the adjustment nut; and
 d is the pitch diameter.
As indicated by equation (1), the pitch diameter d varies inversely with the helix angle $\theta$. That is, as the pitch diameter d becomes larger, the helix angle $\theta$ becomes smaller and vice-versa. In this way, the pitch diameter d of bore 204 of adjustment nut 128 may be configured to receive different shaft configurations by varying the helix angle θ of pin cavities 206 and, thus, thread pins 208.

Figure 13:
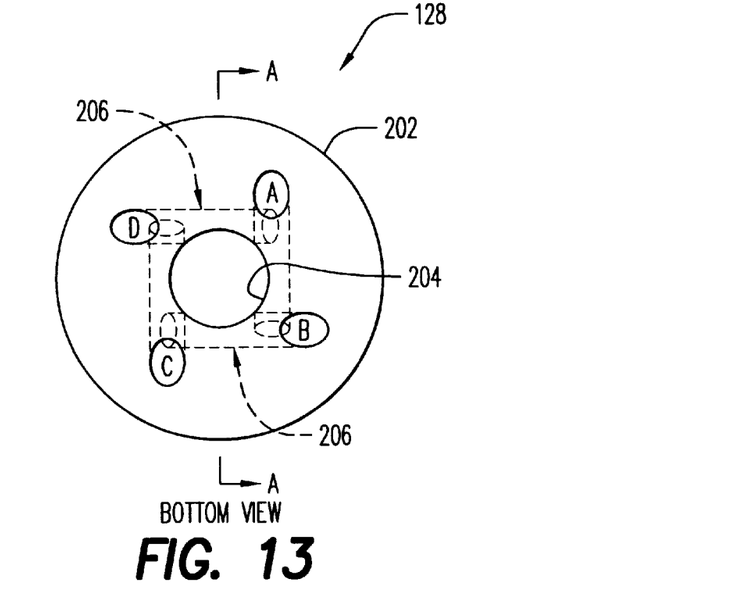
FIG. 13 is a bottom view of a third embodiment of the adjustment nut of FIG. 9.
Figure 14:
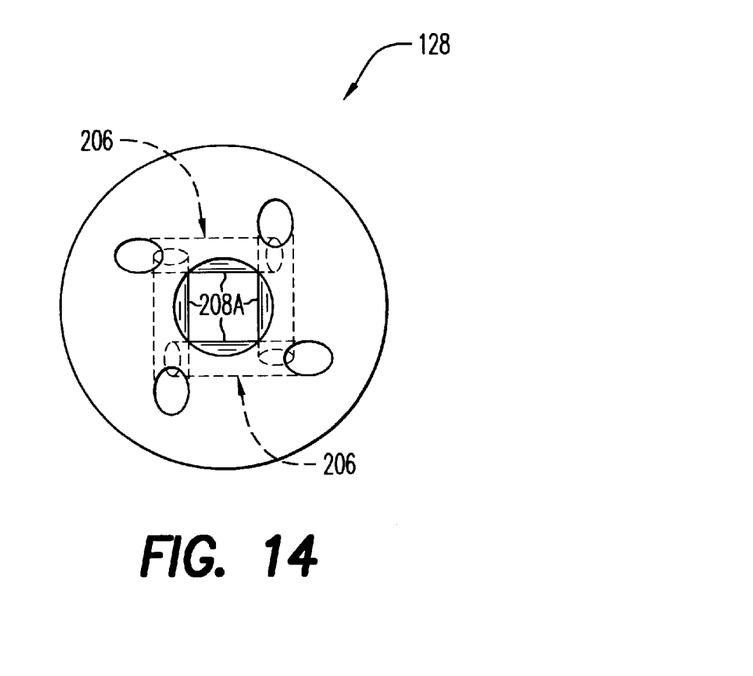
FIG. 14 is a bottom view of a third embodiment of the adjustment nut of FIG. 13 in which a plurality of thread pins are arranged there to form an external thread.
Figure 15:
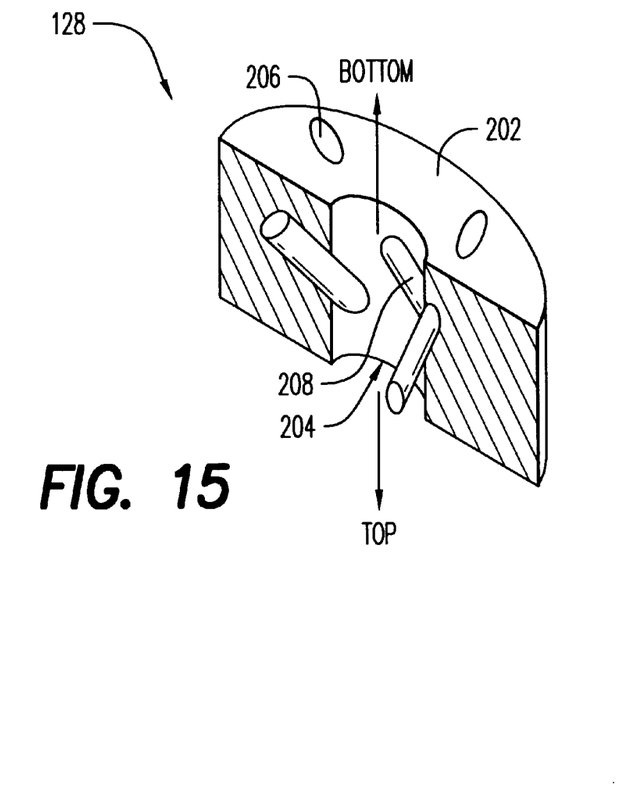
FIG. 15 is a cross-sectional view of the third embodiment of the adjustment nut of FIG. 13.

It is preferred that adjustment nut 128 employs four pin cavities 206 and four thread pins 208, with respective portions 208A forming an approximately square-like configuration, as generally shown in FIGS. 13 and 14. Each portion 208A of each thread pin 208 engages the threads of shaft 120 when adjustment nut 128 is engaged and rotated about the shaft. Although four thread pins 208 are employed in the preferred embodiment, adjustment 208 may employ any number of thread pins arranged at any helix angle θ for engagement and disengagement of shaft 120.

Although adjustment nut 128 may be configured to provide any desired pitch diameter d, it is preferred that thread pins 208 are arranged with a pitch diameter d of approximately ⅝ inches to approximately 1.5 inches and preferably by four starts.

The present invention having been thus described with particular reference to the preferred forms thereof, it will be obvious that various changes and modifications may be made therein without departing from the spirit and scope of the invention as defined in the appended claims.

What is claimed is:

1. A system for locking at least one ski against a platform comprising:
    a shaft having an end adapted to be secured to the platform, said shaft having an outer surface;
    means for holding said at least one ski against the platform;
    means for adjustably applying pressure to said holding means, said pressure applying means including an adjustment nut disposed for rotation about said shaft for motion axially relative to said platform between a first position for securing said at least one ski between said holding means and the platform, and a second position for releasing said at least one ski from between said holding means and the platform; and
    quick acting means for providing a significant axial adjustment of said pressure applying means for a partial turn of said adjustment nut about said shaft to move said adjustment nut between said first and second positions, said quick acting means including a plurality of threads formed on a portion of said outer surface and a plurality of elements formed at different radial locations on said adjustment nut, whereby said adjustment nut is adapted to be rotated said partial turn by a tool that removably engages any one of said plurality of elements.

2. The system of claim 1, wherein said elements are apertures.

3. The system of claim 1, wherein said adjustment nut has a circumference, and wherein said radial locations are disposed about said circumference.

4. The system of claim 1, wherein said partial turn is a three-quarter turn.

5. The system of claim 1, wherein said plurality of elements is at least three.

6. The system of claim 1, wherein said plurality of elements is six.

7. The system of claim 1, wherein each of said plurality of threads extends an axial distance of about ½ of an inch to about 1 inch for every rotation about said shaft.

8. The system of claim 1, wherein:
    said first position of said pressure applying means is attained by rotating said pressure applying means in a first direction; and
    said second position of said pressure applying means is attained by rotating said pressure applying means in a second direction.

9. The system of claim 1, wherein said shaft includes a lower portion that is secured to the platform and an upper portion that supports said pressure applying means.

10. The system of claim 1, wherein said pressure means includes a lifting nut attached to said adjustment nut and disposed about said shaft, said lifting nut being effective to axially position said adjustment nut when rotated about said shaft.

11. The system of claim 1, further comprising a foot element connected to said shaft, a top plate connected to said holding means and an anti-rotation pin connected to said foot element and said top plate.

12. The system of claim 1, further comprising a top plate connected to said holding means, a handle plate connected to said pressure means and a locking pin connected to said top plate and said handle plate.

13. The system of claim 1, wherein said holding means includes an aperture, and wherein said shaft includes an upper shaft and a lower shaft.

14. The system of claim 1, wherein said shaft includes an upper and lower shaft.

15. The system of claim 14, wherein said upper shaft has an outer surface and a plurality of upper threads formed about said outer surface.

16. The system of claim 15, wherein said upper shaft has an outer surface and a plurality of upper threads formed about said outer surface for receiving said adjustment nut.

17. The system of claim 14, further comprising means for engaging and disengaging said upper shaft and said lower shaft.

18. The system of claim 14, wherein said upper shaft has an insertion end and said lower shaft has a receiving end, and wherein said insertion end and said receiving end interlock when said adjustment nut is at said first position and said insertion end disengages said receiving end when said adjustment nut is at said second position.

19. The system of claim 14, wherein said upper shaft has a receiving end, wherein said lower shaft has an insertion end and further comprising means that passes through said receiving end and said insertion end for interlocking said receiving and insertion ends together.

20. The system of claim 1, wherein the adjustment nut includes a body having a bore therethrough for receiving said shaft, and a plurality of pins arranged in said body, with each of said pins having a portion extending into said bore to engage said shaft.

21. The system of claim 20, wherein each of said plurality of pins is a thread pin.

22. The system of claim 21, wherein said plurality of pins is four pins.

23. The system of claim 20, wherein said body includes a plurality of cavities for receiving said plurality of pins.

24. The system of claim 23, wherein each of said plurality of cavities extend from an outer surface of said adjustment nut into said bore.

25. The system of claim 24, wherein said plurality of cavities are spaced-apart from each other.

26. The system of claim 20, wherein said bore has a thread pitch that ranges from about ⅝ inches to about 1.5 inches.

27. The system of claim 20, wherein said portion is a side surface portion.

28. The system of claim 20, wherein said portion of each of said pins extends into said bore at a predetermined angle.

29. The system of claim 28, wherein said predetermined angle varies inversely with a thread pitch of said bore.

30. The system of claim 28, wherein each of said plurality of pins is a thread pin.

31. The system of claim 30, wherein said plurality of thread pins form one turn about a circumference of said bore.

32. The system of claim 20, wherein each of said plurality of pins is a press fit pin.

33. The system of claim 1, further comprising means for preventing removal of said adjustment nut from said shaft.

34. The system of claim 33, wherein said preventing means prevents removal of said holding means and said adjustment nut from said shaft at said first position.

35. The system of claim 33, wherein said preventing means includes means for preventing rotation of said adjustment nut means about said shaft.

36. The system of claim 33, wherein said preventing means includes means for preventing axial movement of said adjustment nut about said shaft.

37. The system of claim 33, wherein said preventing means includes:
   a locking bar connected to a surface of said holding means, opposite the platform; and
   a connector detachably connected between said adjustment nut and said locking bar to prevent removal of said holding means and said adjustment nut from said shaft.

38. The system of claim 37, wherein said connector is a handle for rotating said adjustment nut.

39. The system of claim 37, wherein said connector and said locking bar are connected by a clip.

40. A system for locking at least one ski against a platform comprising:
   a shaft having screw threads on at least a portion thereof, said shaft having a first end;
   first means, adapted to be removably connected to the first end of said shaft, and adapted to be secured to said platform;
   an adjustment nut disposed for rotation about said shaft, for axial movement relative to the platform when rotated about said shaft, said adjustment nut having a plurality of pins adapted to engage the threads of said shaft; and
   means, disposed adjacent to said adjustment nut, for holding said at least one ski against the platform,
   wherein said adjustment nut has a first position for securing said at least one ski between said holding means and the platform, and a second position for releasing said least one ski from between said holding means and the platform.

41. A system for locking at least one ski against a platform comprising:
   a shaft having a first end;
   first means, adapted to be removably connected to the first end of said shaft, and adapted to be secured to said platform;
   an adjustment nut disposed for rotation about said shaft for axial movement relative to the platform when rotated about said shaft;
   quick acting means for providing a significant axial adjustment of said adjustment nut for a slight turn of said adjustment nut; and
   means, disposed adjacent to said adjustment nut, for holding said at least one ski against the platform,
   wherein said adjustment nut has a first position for securing said at least one ski between said holding means and the platform, and a second position for releasing said least one ski from between said holding means and the platform.

42. The system of claim 41, further comprising a washer adapted to be positioned between said holding means and said adjustment nut.

43. The system of claim 41, further comprising means for rotating said adjustment nut.

44. The system of claim 41, wherein said shaft has a first end integrally secured to the remainder of the shaft.

45. The system of claim 41, wherein the first end of said shaft has a hook shape that is readily adapted to be connected to said first means.

* * * * *